United States Patent [19]

Gianfrancesco

[11] Patent Number: 5,177,979

[45] Date of Patent: Jan. 12, 1993

[54] METHOD AND APPARATUS FOR THE ABSORPTION-COOLING OF A FLUID

[76] Inventor: Roberto Gianfrancesco, 20089 Sesto San Giovanni, Milan, Italy

[21] Appl. No.: 727,130

[22] Filed: Jul. 9, 1991

[30] Foreign Application Priority Data

Aug. 10, 1990 [IT] Italy ............... 21259 A/90

[51] Int. Cl.⁵ ............................................. F25B 15/06
[52] U.S. Cl. ........................................ 62/335; 62/476; 62/324.2
[58] Field of Search ....................... 62/476, 335, 324.2, 62/238.3

[56] References Cited

U.S. PATENT DOCUMENTS

| | | | |
|---|---|---|---|
| 3,483,710 | 12/1969 | Bearint | 62/335 |
| 4,037,426 | 7/1977 | Rojey | 62/335 |
| 4,299,093 | 11/1981 | Cohen et al. | 62/476 |
| 4,441,332 | 4/1984 | Wilkinson | 62/476 |
| 4,448,040 | 5/1984 | Kunugi | 62/238.3 |
| 4,475,361 | 10/1984 | Alefeld | 62/476 |
| 4,542,628 | 9/1985 | Sarkisian et al. | 62/335 |
| 4,667,485 | 5/1987 | Ball et al. | 62/335 |
| 4,732,008 | 3/1988 | DeVault | 62/476 |
| 4,827,728 | 5/1989 | DeVault et al. | 62/335 |

Primary Examiner—Henry A. Bennet
Assistant Examiner—William C. Doerrler
Attorney, Agent, or Firm—Oblon, Spivak, McClelland, Maier & Neustadt

[57] ABSTRACT

The invention relates to an apparatus for the absorption cooling of a fluid, in particular air.

Two separate mutually independent but interacting absorption cooling devices are provided, the cooling system of one of the two devices being used for cooling the absorbent liquid of the other device, this liquid, after dilution, by the fact of having absorbed steam, being boiled by heat provided by condensing steam resulting from boiling the diluted absorbent liquid of the initially considered absorption device by means of an external burner.

The pressure in each component of the absorption device used for directly cooling the air is less than the pressure in the corresponding component of the other device, the absorbent liquid of which is cooled by external cooling fluid. The two devices are provided with heat exchangers cooled with air, such heat exchangers being serially arranged so that the same airflow passes therethrough.

1 Claim, 1 Drawing Sheet

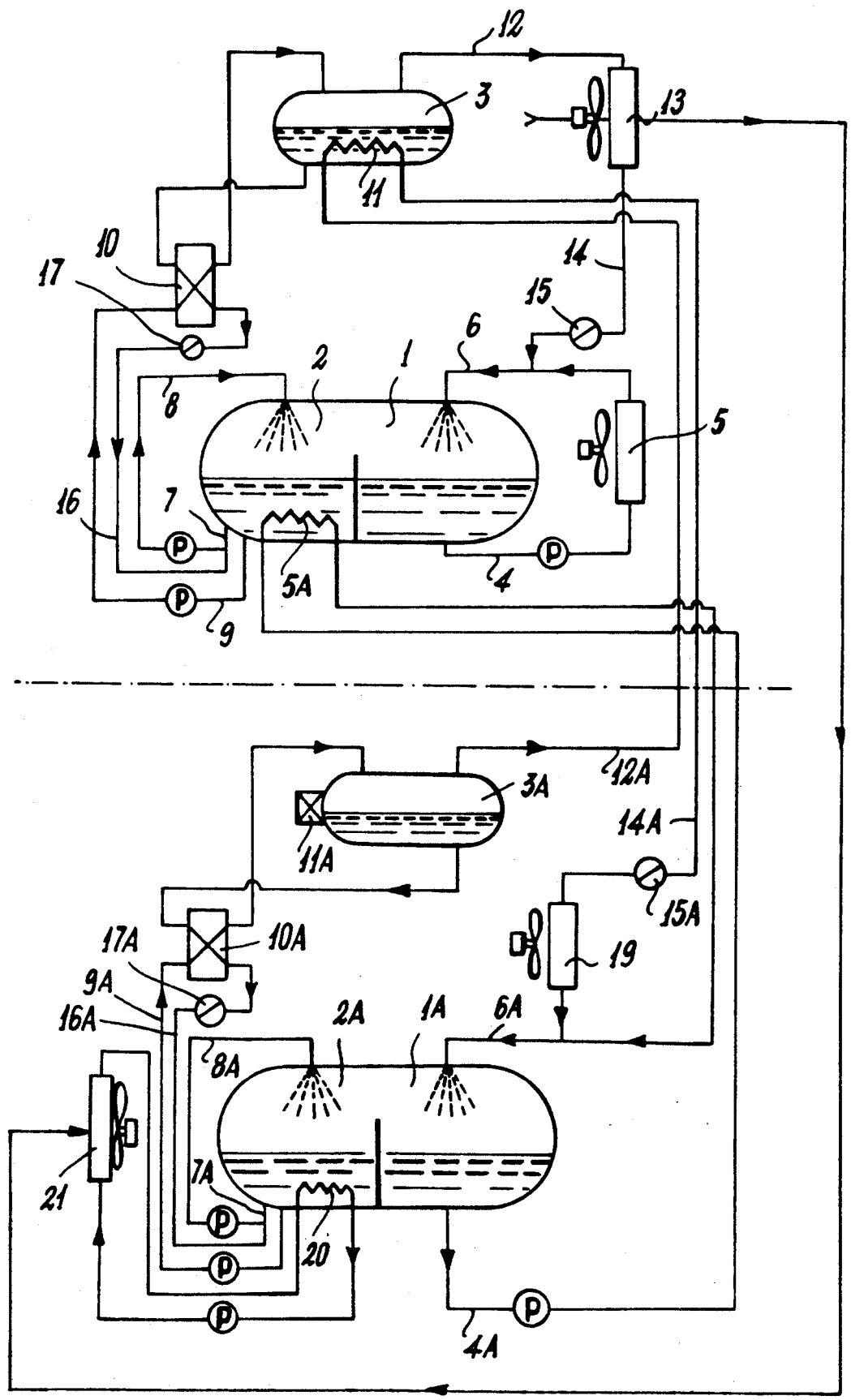

METHOD AND APPARATUS FOR THE ABSORPTION-COOLING OF A FLUID

BACKGROUND OF THE INVENTION

1. Field of the Invention

The present invention relates to an and apparatus for the absorption-cooling of a fluid, in particular air.

2. Discussion of the Background

Air cooling, commonly known as air conditioning, is achieved by two different systems.

A first system, widely used for air conditioning in buildings and vehicles, uses compressors operating with chlorofluorocarbons and driven by electric motors or vehicle engines.

A second system, known as an absorption system, operating normally with saline solutions, is applied in practice only to very large buildings because although it consumes very little electric power it requires large cooling towers to disperse the heat produced.

Traditional air conditioners of the compressor type consume considerable power, this being very important when used in vehicles. In addition, air conditioners of this type are very dependent in operation on the engine r.p.m. when installed in motor vehicles.

It should also be noted that the use of chlorofluorocarbons constitutes a serious source of ecological damage, as is now well known throughout the world.

Air conditioning machines of absorption type have many undoubted advantages over air conditioners of compressor type, both in terms of electrical power consumption, which is very low, and in ecological terms as the saline solutions generally used cause no damage if lost to the environment external to the apparatus.

However, absorption air conditioners produce a very large heat quantity to be dispersed, this quantity being double that of compressor air conditioners of equal capacity. This heat has to be at least partly dispersed from an aqueous saline solution, generally of lithium bromide, having a temperature of about 42° C., to produce very cold water at about 4° C., usable for cooling the air to be conditioned. This temperature of 42° C., which is very close to the temperature reached during the summer months in many countries, including those of temperate climate, is often less than the temperature reached in hot or equatorial countries. Thus in no way can the external air be used as a cooling medium, and in fact currently known absorption air conditioners comprise cooling water circuits for the saline solution, this water then being cooled in evaporative cooling towers, making it impossible to apply the system to vehicles or small users.

As is well known to the expert of the art, the saline solution temperature of 42° C. is strictly related to the vapor pressure of the very cold water and to the solution concentration. An increase in this temperature could only be achieved by increasing the salt concentration in the solution, but in practice this is not possible under normal working conditions because the salt concentration in the water is already very close to the crystallization curve, and the formation of crystals within the solution circulation circuits is obviously to be totally avoided.

SUMMARY OF THE INVENTION

The main object of the present invention is to provide an apparatus for absorption air conditioning, which is of low electricity consumption, can be cooled directly by the external air, is of small overall size in relation to the installed refrigeration power and can hence be easily applied to air conditioners both in motor vehicles and in closed environments.

An absorption apparatus for cooling a fluid, in particular air, comprising two separate absorption cooling devices, each having a mutually communicating evaporator and absorber and a generator, in which a pressure substantially less than atmospheric is maintained in the evaporator and in the absorber, water being present in the evaporator, from which it is withdrawn to be returned to the evaporator after passing through a heat exchanger in which the water absorbs heat, a steam absorbent liquid being present in the absorber, from which it is withdrawn to be returned to the absorber after at least partly passing into said generator in which the pressure is higher than that in the corresponding evaporator and absorber and in which a heating member is provided to boil said absorbent liquid, with the formation of steam which is withdrawn and then condensed in a steam condensing heat exchanger after which it is returned to said evaporator, and with the formation of a concentrated absorbent liquid which is returned to the absorber after passing through a heat exchanger in which it transfers heat to the absorbent liquid from the absorber, in the absorber there being provided a heat exchanger for cooling the absorbent liquid, wherein said water heat exchanger of the first device is the heat exchanger through which the air to be cooled passes, whereas in the second device it constitutes the heat exchanger for cooling the absorbent liquid of the first device, the heat exchanger for cooling the absorbent liquid of the second device being a heat exchanger which transfers heat to a fluid external to the two devices, the heating member for the absorbent liquid in the generator of the first device being the heat exchanger for condensing the steam from the generator of the second device whereas in the generator of the second device it consists of a burner, and the pressure and hence the temperature in the evaporator and absorber of the first device being less than those in the corresponding components of the second device, characterized in that the heat exchanger for cooling the absorbent liquid of the second device is in series with the steam condensing heat exchanger of the first device, in that said two heat exchangers are cooled with air which is first forced through the heat exchanger of the second device and thereafter through the heat exchanger of the first device, and in that the pressures and temperatures in the two generators are of such value that the saturation temperature of the steam in the heat exchanger of the first device enables condensation of such steam by the air cooling such exchanger.

Advantageously, the method and apparatus of the present invention are used for the simultaneous generation of heat which can be used to heat water usable directly or indirectly. This characteristic enables the apparatus to be considered as a true high efficiency heat pump.

The method and the structure and characteristics of the apparatus according to the present invention will be more apparent from the description of a simplified embodiment given hereinafter by way of non-limiting example with reference to the accompanying drawing, in which the single figure is a schematic representation of an apparatus for the absorption cooling of air.

The apparatus for the absorption cooling of air shown schematically on the drawing comprises two separate absorption cooling devices which are mutually independent but interact. The first device is positioned entirely above the horizontal dashed and dotted line shown in the center of the drawing, whereas the second device is mostly positioned below this line, but with two of its component parts above said line to interact with the first device.

The two absorption devices are each of well known conventional structure and operation and will therefore not be described in detail, the following explanation being sufficient for their understanding.

The two devices each comprise an evaporator 1, 1A and an absorber 2, 2A communicating with each other (and in which a pressure substantially lower than atmospheric is maintained), and a generator 3, 3A.

Water is present in the evaporators 1, 1A and is withdrawn to be returned to the top of the evaporators after passing through a line 4, 4A, a pump P, a heat exchanger 5, 5A in which the water absorbs heat (i.e. transfers cold to the external environment), and a line 6, 6A.

A liquid (preferably an aqueous solution of lithium bromide) for absorbing the steam generated in the adjacent evaporator is present in the absorbers 2, 2A, this liquid being withdrawn through a line 7, 7A to be recycled to the top of the absorber though a recycle line 8, 8A provided with a pump P. Part of the liquid withdrawn from each absorber is fed via a line 9, 9A, a pump P and a heat exchanger 10, 10A to the generator 3, 3A in which the pressure is higher than that in the corresponding evaporator and absorber.

The liquid present in the generator is brought to boiling by a heating member 11, 11A. In this manner steam is formed, and is withdrawn from the top of the generator, passed through a line 12, 12A and then through a condensing heat exchanger 13, 11 in which the steam condenses to be then returned to the respective evaporator 1, 1A via a return line 14, 14A comprising a liquid-vapor separation device 15, 15A of known type. A heat exchanger 19 is included in the line 14A to further reduce the liquid temperature.

It should be noted that reference numeral 11 indicates a component acting as a heating member for the absorbent liquid present in the generator 3 while simultaneously acting as a cooling and condensing member for the superheated steam from the generator 3A.

Whereas the absorbent liquid present in the generator 3 of the first device is heated and boiled by the member 11 forming part of the cooling and condensation circuit of the second device, the liquid present in the generator 3A is heated and boiled by the flame of a fuel burner 11A, generally using a gaseous fuel.

The concentrated absorbent liquid obtained in each generator 3, 3A is returned to the respective absorber 2, 2A after passing through said heat exchanger 10, 10A (in which it transfers heat to the dilute absorbent liquid from the absorber) and through a return line 16, 16A which opens upstream of the pump P connected into the line 8, 8A. As can be seen from the drawing, a liquid-vapor separation device 17, 17A of known type is also included in the line 16, 16A.

The liquid present in each absorber 2, 2A is cooled by a cooling heat exchanger. In the case of the absorber 2, the cooling heat exchanger is the actually already mentioned heat exchanger 5A forming part of the second absorption cooling device and also acting as a heat exchanger in which the water of the second device absorbs heat. In the case of the absorber 2A the heat exchanger for cooling the dilute absorbent liquid present in the absorber is indicated by the reference numeral 20 and forms part of a cooling circuit comprising a radiator or heat exchanger 21, which is independent of the two absorption cooling devices and transfers heat to the external environment.

It can therefore be seen that the heat exchanger 5 of the first device in which the very cold water from the evaporator 1 absorbs heat is in practice the heat exchanger through which the air used for cooling the interior of a vehicle or a building passes, whereas the heat exchanger 5A of the second device in which the very cold water from the evaporator 1A absorbs heat operates as a heat exchanger for cooling the dilute absorbent liquid present in the absorber 2 of the first device (the heat exchanger for cooling the dilute absorbent liquid of the second device being the heat exchanger 21 which transfers heat to a fluid, generally air, external to the two devices).

It can also be seen that the heating member 11 for the absorbent liquid in the generator 3 of the first device is in practice the heat exchanger for cooling and condensing the steam from the generator 3A of the second device, whereas in the generator 3A the heating member is a burner, in particular a gas burner. The superheated steam from the generator 3 is condensed by passing it through the heat exchanger 13 positioned upstream of the separation device 15.

In all cases the pressure and consequently the temperature in each constituent component of the first device are always less than the pressure and temperature in the corresponding component of the second device.

Preferably the hot water originating from the generator 3A via the line 14A is cooled in a cooling heat exchanger 19 connected to the line 6A.

It will be assumed for example that very cold water at an inlet temperature of 4° C. is required at the heat exchanger 5 for cooling the air. In this case the pressure in the evaporator 1 and in the absorber 2 must be the saturation pressure of water at this temperature. Any liquid able to absorb steam can be used as the absorbent liquid, for example an aqueous solution of lithium bromide with a concentration variable between about 65% by weight and 62% by weight.

The heat water which is returned to the evaporator 1 partly evaporates on absorbing heat. The absorbent liquid which is returned to the absorber 2 at a temperature of about 50° C. absorbs heat in absorbing the steam, with the result that the dilute absorbent liquid present in the bottom of the evaporator must be cooled to a temperature of about 42° C. by the heat exchanger 5A. The liquid taken from the bottom of the absorber 2 is fed into the generator 3, which is at a pressure of about 1 ata and a temperature of about 160° C., the steam present in it having a saturation temperature of 100° C. (and hence easily coolable with air at ambient temperature, even in equatorial regions).

The liquid from the generator 3 is cooled in the heat exchanger 10 to be fed to the line 7 at a temperature of about 60° C.

The superheated steam from the generator 3 is condensed and cooled in the heat exchanger 13 to be fed to the line 6 at a temperature of about 45° C.

The heat exchanger 5A, through which water circulates at a temperature of about 35° C., is used to cool the dilute absorbent liquid present in the absorber 2. The pressure in the evaporator 1A and absorber 2A is that corresponding to the water saturation pressure at the stated temperature.

The absorbent liquid in the second device can have the same concentration as in the first device, the temperature of the liquid in the absorber 2A being about 80° C. entering and 72° C. leaving. This liquid is easily cooled with atmospheric air by means of the radiator 21, even in equatorial regions.

In the generator 3A the temperature is about 230° C. and the pressure about 7.5 ata, the saturation temperature of the steam present being 168° C. and hence being able to heat the generator 3. If the saturation temperature of the steam produced in the generator 3A is not sufficiently high (in relation to the heat transfer area of the heating member 11) to concentrate the liquid in the generator 3, the burner 11A automatically raises this temperature to the optimum value. Consequently, temperature and pressure control in the two generators 3, 3A is automatic, depending on the cooling conditions in the condensing heat exchanger 13. This latter can be controlled to maintain constant pressure in the generator 3 to avoid the risk of the absorbent liquid crystallizing in the cooler parts of the apparatus.

The heat exchanger 19 further cools the return liquid from the member 11 to about 45° C., to further improve the system efficiency.

The absorber of the first device shown schematically on the accompanying drawing is cooled by the heat exchanger 5A. This presupposes a transfer of sensible heat and hence a temperature difference between the cooling fluid entering and leaving said heat exchanger. In the apparatus according to the present invention, the cooling fluid is under saturation conditions and therefore absorbs heat by evaporation, the steam produced being absorbed directly by the absorber 2A of the second device.

It should be noted that in the described apparatus, the heat exchanger 13 is in series with the heat exchanger 21. Steam with a condensation temperature of 100° C. is condensed in the heat exchanger 13, whereas in the heat exchanger 21 a liquid is cooled from an inlet temperature of 80° C. to an outlet temperature of 72° C. This enables a reduced quantity of cooling fluid to be used, and if air is used as the cooling fluid its throughput will be only about 50% of that required for a conventional compressor refrigeration unit.

It is important to note that the apparatus of the present invention can function as a heat pump. In this respect, heat is developed in the absorber 2A, in the condensing heat exchanger 13 and in the heat exchanger 19 at a minimum temperature of 72° C. The total heat produced (which can be dispersed with water by suitably arranging the apparatus) is represented by the sum of two sources of heat, the first being the burner 11A and the second being the heat transferred from a fluid external to the two devices by the heat exchanger 5.

Consequently for a heat quantity X provided by the burner 11A, the apparatus is able to provide a heat quantity of X multiplied by the overall efficiency of the apparatus, which is variable depending on the operating conditions but is generally not less than 60%.

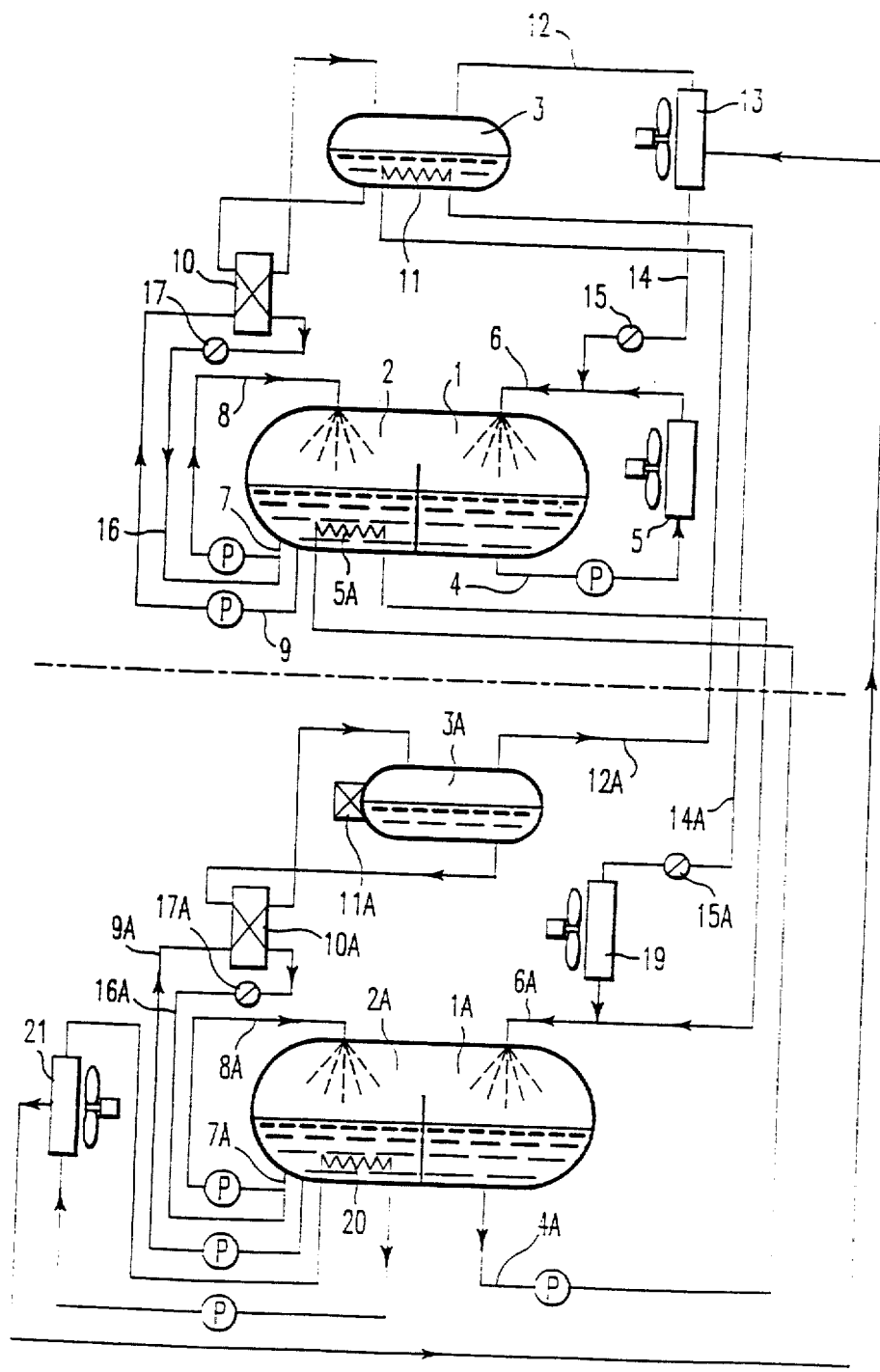

I claim:

1. An absorption apparatus for cooling a fluid comprising:

first and second absorption cooling devices, each device respectively having a water heat exchanger in addition to an evaporator and absorber, which are in fluid communication, and a generator, wherein a pressure substantially less than atmospheric is maintained in the evaporator of each said device and in the absorber of each said device and wherein water is present in the evaporator of each said device, from which the water is withdrawn to be returned to the evaporator of each said device after passing through the water heat exchanger of each said device in which the water absorbs heat, a steam absorbent liquid located in the absorber of each said device, from which the steam absorbent liquid is withdrawn to be returned to the absorber after at least partly passing into said generator of each said device in which the pressure is higher than that in the corresponding evaporator and absorber, a heating member located in each said device for boiling said absorbent liquid and forming steam which is withdrawn and then condensed in a steam condensing heat exchanger after which the condensed steam is returned to said evaporator of each said device, and wherein a concentrated absorbent liquid is returned to the absorber of each said device after passing through a first heat exchanger in each said device in which heat is transferred to the absorbent liquid from the absorber, and wherein each said device including a heat exchanger located in the absorber of each said device for cooling the absorbent liquid, said water heat exchanger of the first device comprising a heat exchanger through which the air to be cooled passes, whereas in the second device, said water heat exchanger comprises a heat exchanger for cooling the absorbent liquid of the first device, wherein the heat exchanger for cooling the absorbent liquid of the second device comprises a heat exchanger for transferring heat to a fluid external to the first and second devices, the heating member for the absorbent liquid in the generator of the first device comprising the heat exchanger for condensing the steam from the generator of the second device whereas in the generator of the second device the heating member comprises a burner, the pressure and the temperature in the evaporator and absorber of the first device being less than that of corresponding components of the second device wherein the heat exchanger for cooling the absorbent liquid of the second device is in series with the steam condensing heat exchanger of the first device; wherein said steam condensing heat exchanger of the first device and said heat exchanger for cooling the absorbent liquid of the second device are cooled with air which is first forced through the steam condensing heat exchanger of the first device and thereafter through the heat exchanger for cooling the absorbent liquid of the second device, and wherein the pressures and temperatures in the generators of each said device are of such a value that the saturation temperature of the steam in the steam condensing heat exchanger of the first device enables condensation of steam by the air cooling said steam condensing exchanger of the first device.

* * * * *

UNITED STATES PATENT AND TRADEMARK OFFICE
CERTIFICATE OF CORRECTION

PATENT NO. : 5,177,979
DATED : January 12, 1993
INVENTOR(S) : Roberto GIANFRANCESCO It is certified that error appears in the above-identified patent and that said Letters Patent is hereby corrected as shown below:

Drawings:

Substitute the attached Figure for the sole Figure of the above-noted patent.

Column 6, line 30, change "including" to --includes--;

line 57, delete "forced through the steam condensing heat";

lines 58 and 59, delete in their entirety;

line 60, change "bent liquid of the second device, and wherein" to --forced through the heat exchanger for cooling the absorbent liquid of the second device and thereafter through the steam condensing heat exchanger of the first device and wherein--.

Signed and Sealed this

Eleventh Day of January, 1994

Attest:

BRUCE LEHMAN

*Attesting Officer*  *Commissioner of Patents and Trademarks*